(12) United States Patent
Sivaramakrishnan et al.

(10) Patent No.: US 8,429,353 B2
(45) Date of Patent: Apr. 23, 2013

(54) DISTRIBUTED HOME-NODE HUB

(75) Inventors: Ramaswamy Sivaramakrishnan, San Jose, CA (US); Stephen E. Phillips, Los Gatos, CA (US)

(73) Assignee: Oracle America, Inc., Redwood City, CA (US)

( * ) Notice: Subject to any disclaimer, the term of this patent is extended or adjusted under 35 U.S.C. 154(b) by 761 days.

(21) Appl. No.: 12/124,002

(22) Filed: May 20, 2008

(65) Prior Publication Data

US 2009/0292881 A1 Nov. 26, 2009

(51) Int. Cl.
G06F 12/00 (2006.01)

(52) U.S. Cl.
USPC .............. 711/141; 711/148; 711/E12.032

(58) Field of Classification Search .............. None
See application file for complete search history.

(56) References Cited

U.S. PATENT DOCUMENTS

| | | | |
|---|---|---|---|
| 4,837,682 A * | 6/1989 | Culler | 710/114 |
| 5,182,808 A | 1/1993 | Bagnoli et al. | |
| 5,412,788 A * | 5/1995 | Collins et al. | 711/157 |
| 5,420,985 A * | 5/1995 | Cantrell et al. | 710/113 |
| 5,517,626 A * | 5/1996 | Archer et al. | 710/110 |
| 5,530,933 A | 6/1996 | Frink et al. | |
| 5,581,782 A | 12/1996 | Sarangdhar et al. | |
| 5,710,907 A | 1/1998 | Hagersten et al. | |
| 5,892,970 A | 4/1999 | Hagersten | |
| 6,175,887 B1 | 1/2001 | Ervin et al. | |
| 6,347,294 B1 | 2/2002 | Booker et al. | |
| 6,546,471 B1 | 4/2003 | Tarui et al. | |
| 6,625,700 B2 | 9/2003 | Ma et al. | |
| 6,782,441 B1 | 8/2004 | Nguyen et al. | |
| 6,963,342 B2 | 11/2005 | Pascual et al. | |
| 6,990,541 B2 | 1/2006 | Clayton | |
| 7,426,630 B1 | 9/2008 | Chong et al. | |

OTHER PUBLICATIONS

Ruud Van Der Pas; "Memory Hierarchy in Cache-Based Systems"; Sun Microsystems; Nov. 2002; 28 pages.
J.A. Kahle, M.N. Day, H.P. Hofstee, C.R. Johns, T.R. Maeurer, D. Shippy; "Introduction to the Cell Multiprocessor"; IBM J. Res. & Dev. vol. 49, No. 4/5, Jul. 2005; 16 pages.
Stephen Phillips; "VictoriaFalls: Scaling Highly-Threaded Processor Cores"; Sun Microsystems; Aug. 21, 2007; 24 pages.
U.S. Appl. No. 11/008,014, filed Dec. 9, 2004.

(Continued)

*Primary Examiner* — Charles Rones
*Assistant Examiner* — Eric Loonan
(74) *Attorney, Agent, or Firm* — Meyertons Hood Kivlin Kowert & Goetzel, P.C.; Jeffrey C. Hood (57) ABSTRACT

A method and a system for processor nodes configurable to operate in various distributed shared memory topologies. The processor node may be coupled to a first local memory. The first processor node may include a first local arbiter, which may be configured to perform one or more of a memory node decode or a coherency check on the first local memory. The processor node may also include a switch coupled to the first local arbiter for enabling and/or disabling the first local arbiter. Thus one or more processor nodes may be coupled together in various distributed shared memory configurations, depending on the configuration of their respective switches.

20 Claims, 7 Drawing Sheets

OTHER PUBLICATIONS

John D. Acton, Michael D. Derbish, Gavin G. Gibson, Jack M. Hardy Jr., Hugh M. Humphreys, Steven P. Kent, Steven E. Schelong, Ricardo Yong, William B. Derolf; "Novel Multiprocessor Distributed Memory System and Board and Methods Therefor"; WO/1998/043148; Mar. 25, 1998. http://www.wipo.int/pctdb/en/wo.jsp?IA=US1998005785&DISPLAY=DESC.

J.S. Aude, M.T. Young, G. Bronstein; "A High-Performance Switching Element for a Multistage Interconnection Network"; Instituto de Matematica e Nucleo de Computacao Eletronica; 1998; 4 pages.

David Kanter; "An Introduction to Multiprocessor Systems"; Dec. 11, 2006; 7 pages. http://www.realworldtech.com/page.cfm?ArticleID=RWT121106171654.

Bui Viet Khoi, Pham Doan Tinh, Nguyen Nam Quan, Inigo Artudo, Daniel Manjarres, Wim Heirman, Christof Debaes, Joni Dambre, Jan Van Campenhout, Hugo Thienpont; "Reconfigurable Interconnection Networks in Distributed Shared Memory Systems: A Study on Communication Patterns"; IEEE; 2006; pp. 343-347.

Matteo Monchiero; Gianluca Palermo, Cristina Silvano, Oreste Villa; "Exploration of Distributed Shared Memory Architectures for NoC-based Multiprocessors"; IEEE; 2006; pp. 144-151

Jelica Protic, Milo Tomasevic, Veljko Milutinovic; "A Survey of Distributed Shared Memory Systems"; Proceedings of 28th Annual Hawaii International Conference on System Sciences—1995. pp. 74-84.

H. El-Rewini and M. Abd-El-Barr; "Shared Memory Architecture—Chapter 3"; Advanced Computer Architecture. 2005; pp. 1-23.

Shigeki Shibayama, Kazumasa Hamaguchi, Toshiyuki Fukui, Yoshiaki Sudo, Tomohiko Shimoyama, Shuichi Nakamura; "An Optical Bus Computer Cluster with a Deferred Cache Coherence Protocol"; 1996; pp. 175-182.

"Going Green—and Gaining Performance —New UltraSPARC T2 CPU Doubles Threads from 32 to 64"; Sun Microsystems; 2006; http://www.sun.com/emrkt/innercircle/newsletter/0407feature.html.

* cited by examiner

DISTRIBUTED HOME-NODE HUB

FIELD OF THE INVENTION

The present invention relates to the field of distributed shared memory. In particular, the invention relates to a system and method for processor nodes configurable to operate in various distributed shared memory topologies.

DESCRIPTION OF THE RELATED ART

In multiprocessor systems with distributed shared memory, each processor node (or cpu) may have a fraction of the total system memory that is local to it. An arbiter may be required to keep the total memory coherent and also to provide fair access to the memory from all processor nodes. To be functional this arbiter may need to have visibility into the outstanding memory requests from each processor node. For example, in a fully connected (glueless) topology, each node may be configured as an arbiter for its local memory (i.e., the memory address space that is local to it). In a star/hub topology, the function of arbitration may performed by a centralized hub switch.

One problem for multi-core processors is that when they are used separately, i.e., if the operating system (OS) is in charge of transferring data between the two processors, then not only are the accesses very slow, but the actual memory for the two processors may not be coherent. Lack of coherency means that the memory that is local to one processor may have data that is different from the same memory location at the other processor. Thus a better solution would perform memory accesses on the hardware level, and not on the OS level.

Regarding hardware level memory accesses for distributed chips, there are several approaches that provide coherent memory access for multiple processors. In a glueless topology, each node can act as an arbiter for the memory address space that is local to it. A star topology uses a central arbiter operable to keep memory coherent and provide fair access to the connected system memory from all of the distributed processor nodes.

However, there is a need for a multi-processor system that is dynamic across various distributed shared memory topologies, and thus allows various distributed memory configurations without having to use a different version of the processor.

SUMMARY

In a multi-processing system that includes a plurality of processor nodes each coupled to local memory, various memory access topologies may be selectively used depending on the configuration of the multi-processing system. Various topologies may be used, such as a fully-connected ("glueless") and a star topology. Each processor node may include one or more processing cores, one or more local memory caches, local memory, and one or more address, data, and control buses, in addition to the elements described below. Thus two or more processor nodes may be configured in a multi-processor system, and a system designer may configure (e.g., using a switch on each processor node) a subset or all of the processor nodes to operate using a selected memory access topology.

Specifically, two or more processor nodes may be connected together in order to provide multi-processor performance. Each processor node may include a local arbiter and a switch that can configure the arbiter to operate in one or more of a first topology, such as a glueless configuration, and a second topology, such as a star configuration. In some embodiments, the switch may operate to place the arbiter in another distributed shared memory topology, such as a ring topology, or may allow choice between 3 or more different types of topologies. In other words, each processor node can be configured to operate in one of a plurality of different distributed shared memory topologies without having to use a different version of that processor node. This may have the benefit of lower manufacturing costs for the maker of the processor node. This is because only one version of the processor node is needed, instead of multiple versions where each is adapted for a different distributed memory model.

Furthermore, this technique may have the benefit of giving the system designer flexibility to use the processor nodes in more than one configuration, depending on the needs of the client, and without the need to repurchase a similar processor node with a different distributed shared memory configuration. The processor nodes may be configured (e.g., using the switch) to be in a selected shared memory topology after they have been included in the multi-processor system, or alternatively after fabrication and prior to being included in the multiprocessor system.

In a first topology, e.g., the glue-less topology, a first processor node with a fully enabled first arbiter may be connected to a second processor node with a fully enabled second arbiter; i.e., there either is no central arbiter or it is not used. Each processor node may have local memory coupled to it, as well as one or more caches that store commonly used values. If the memory access yields a cache miss in the first processor node, then the first arbiter may decode, from the address of the memory access, the processor node identification (id) of a proper processor node, and thus the proper arbiter for this memory access.

If the proper processor node is the first node, i.e., a home processor node for this memory access, the first processor node may then perform memory coherency checks (i.e., resolve any conflicts with any with outstanding requests from all the other node(s)). If there is a conflict, a list of conflicting memory accesses (requests) may be created and the processing of the incoming requests may be deferred to the end of that list. After any conflicts are resolved, this memory access/request may be placed to the local memory.

If the proper processor node is the second processor node, i.e., a remote processor node for this memory access, then the memory access may be forwarded to the second processor node. Here the second processor node may perform the memory coherency checks, (i.e., resolve any conflicts with any outstanding requests from all the other node(s)). If there is a conflict, a list of conflicting memory accesses (requests) may be created and the processing of the incoming requests may be deferred to end of that list. After any conflicts are resolved, this memory access/request may be placed to the local memory. Furthermore, any data read from the second processor node's local memory may be returned to the first node in order to complete the original memory access/request. In some embodiments, the memory access may be forwarded to another node, e.g., the first processor node, instead of accessing the memory local to the node that just performed the memory coherency check (i.e., the second processor node in this example).

Furthermore, in the above two node example, each processor node may have one-half of the total memory local to it. In general, in an N-node symmetric glueless topology, each of the N processor nodes may have 1/N of the address space local to it. For example, one half of the total memory, i.e., the total address space, may be local to the first processor node, whereas the other half may be local to the second processor node.

Thus generally, in the first topology, e.g., the distributed or glueless topology, a processor node may be characterized as being the home-agent for the address space that is local to it. On a cache miss, the address of a memory access may be decoded to determine the ID of the home-agent. The miss request may be then forwarded to the arbiter or coherence unit (CU) in the home agent node where it may be ordered with respect to same address requests from the other processor nodes. In some embodiments, the ordering may be performed with the help of a CAM (content addressed memory) in the home-agent arbiter. The ordering that may be imposed at the home-agent arbiter may be seen consistently across all processor nodes in the system. In some embodiments, the access to memory is performed by the CU in the home-agent, but it may also be forwarded to one of the other processor nodes. Data obtained from memory access may be then forwarded to the requesting node.

In a second topology, such as the star topology, all memory access requests may be forwarded to a centralized arbiter, which may perform conflict resolution and issue the memory access request to the memory node (i.e., the proper processor node) for that memory access request. In some embodiments, the initial processor node, where the memory access was initiated, may perform memory node decode operation and forward the proper memory access request to one or more of the central arbiter and/or the proper home processor node for that memory access.

In some embodiments, in the star topology, the distribution of the total memory may also be split up in an N-node symmetric fashion, where each of the N nodes has 1/N of the total memory, i.e., the address space local to it. For example, one half of the address space may be local to the first processor node, where it is thought to be local to the first processor node, also referred to as the home-agent for the first local memory. Similarly, about one half of the address space may be local to the second processor node, where it is also thought to be local to the second processor node, also referred to as the home-agent for the second local memory. In some embodiments, a memory node decode may operate to determine which processor node has the memory portion that the memory access is trying to access.

On a cache miss, a memory access request may be forwarded to the centralized arbiter. Same address requests from all nodes are serialized in the external hub with the help of address CAMs. The ordering of memory access requests in the external hub (i.e., the central arbiter) may be consistently seen by all processor nodes in the system. After a memory access request is ordered, it may be forwarded to a home-agent node whose local arbiter may be responsible for merely issuing a memory access request to its respective local memory. Data obtained from the respective local memory may then be forwarded to the requesting processor node.

In some embodiments, the processor node with a switch that can enable/disable a local arbiter provides a unified processor node design that scales up to a fixed number of nodes in a glueless configuration while also providing further expansion possibilities using a star topology. In some embodiments, the arbiter/coherence unit inside every processor node may be configured by software to either perform the function of ordering (e.g., in a first topology) or merely act as a forwarding agent (e.g., in a second topology). In some embodiments, the switch may be configured by register level programming, BIOS, or a voltage line coupled to an input of the processor node. In some embodiments, the switch may be permanently set during the manufacturing process. In some embodiments, the switch may be a mechanical/electrical switch that can be set by a user and/or a manufacturer of a computer system that uses one or more of the processor nodes.

In some embodiments, the implementation of a processor node with a switch that controls the operation of the local arbiter may provides the ability to go from glueless to a star configuration using one or more simple mode bits, and little or no change to a transaction layer of coherence messages exchanged across the processor nodes.

BRIEF DESCRIPTION OF THE DRAWINGS

A better understanding of the present invention can be obtained when the following detailed description of the several embodiments is considered in conjunction with the following drawings, in which.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims.

DESCRIPTION

Figure 1A:
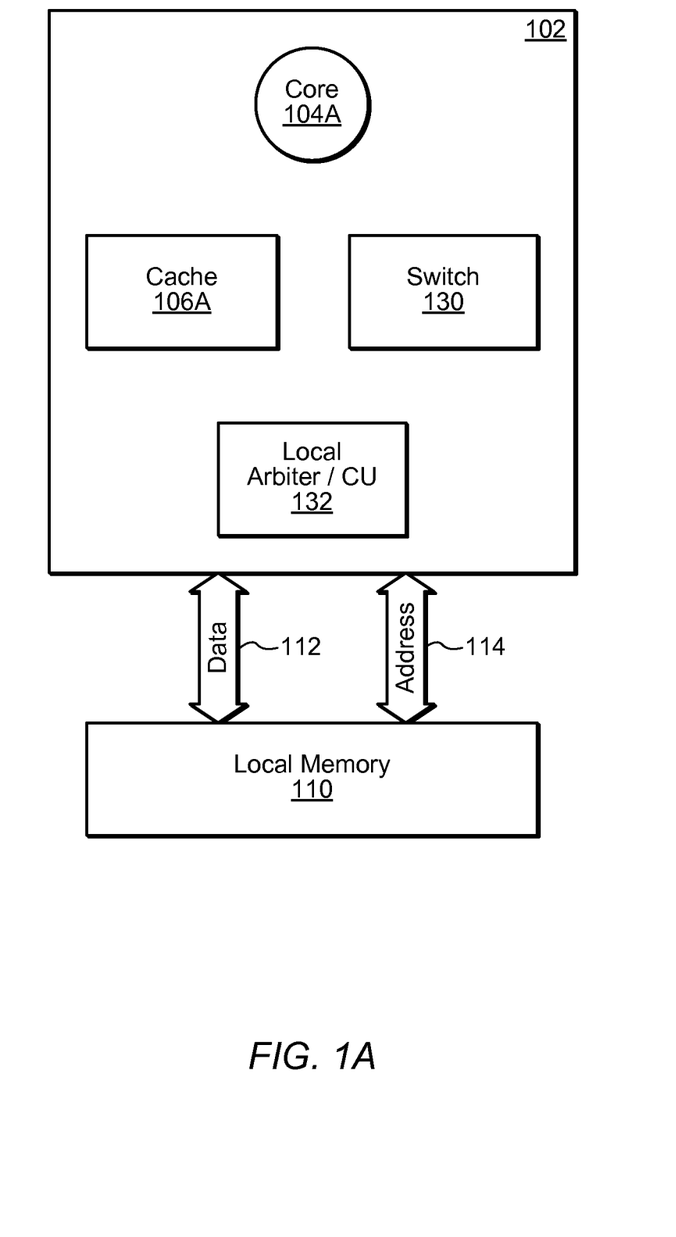
FIGS. 1A and 1B are block diagrams of exemplary processor nodes using one or more processor cores, according to some embodiments.
Figure 1B:
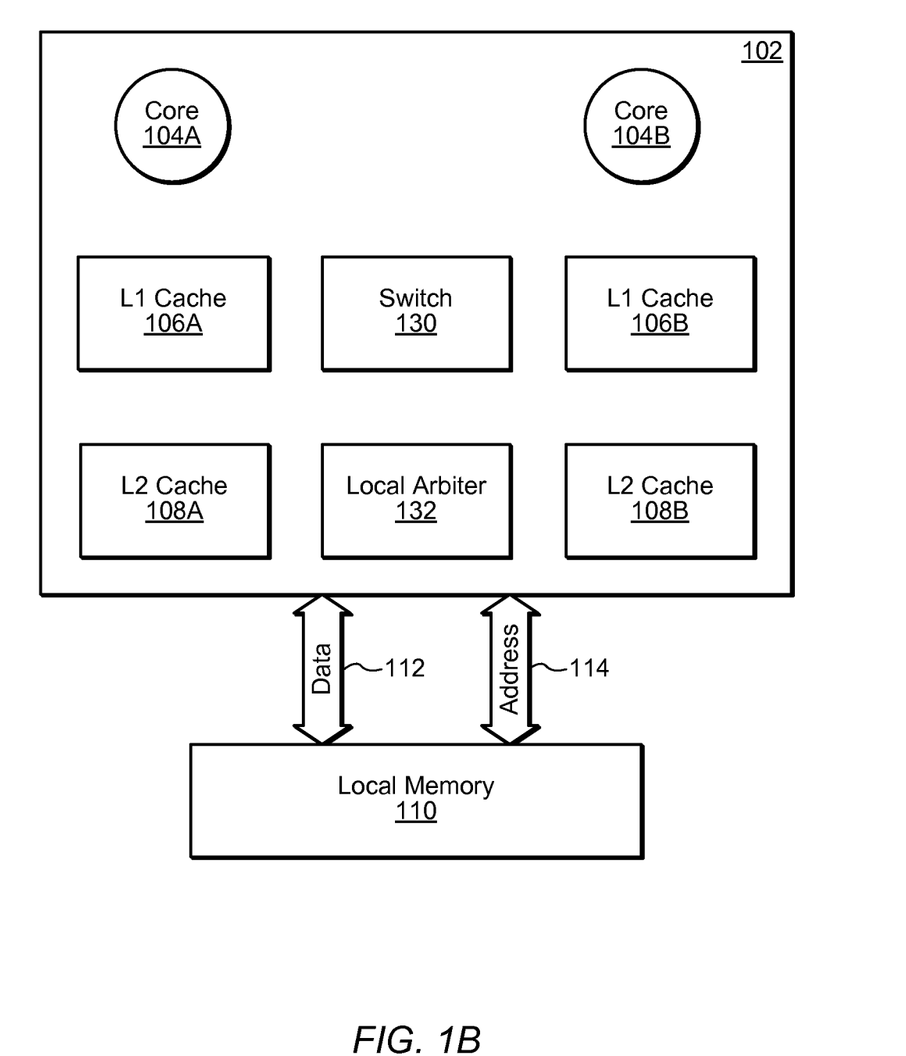

FIGS. 1A and 1B—Schematics of Processor Nodes

FIGS. 1A and 1B are directed to exemplary processor nodes, according to some embodiments. FIG. 1A illustrates an exemplary processor node with a single cpu/core and a single cache, whereas FIG. 1B illustrates an exemplary processor node with a dual processing core and a two level cache. Processor nodes with 3, 4, or more cores are contemplated. Processor nodes with 3 or more level caches are also contemplated. The following description applies to various variations in the structure of the processor node.

As seen in FIG. 1B, the processor node may have one or more processing cores, such as cores 104A and 104B. Furthermore, in some embodiments, each core may have local L1 106A-B and/or L2 108A-B cache. The one or more cores may have separate respective L1 caches but only one unified L2 cache for all the processing cores. Each processor node may have only one unified cache for all of the processing cores. Each processor node 102 may be coupled to a local memory 110. The local memory 110 may store a portion of the total memory of the computer system. In some embodiments, the local memory 110 may be coupled to the processor node 102 using one or more of an address bus 114 and/or a data bus 112. The local memory also may be a part of the processor node.

The processor node 102 may process an instruction that includes memory access. The processor node may receive the instruction from an instruction cache. For example, the processor node 102 may process a READ 0x4444 instruction, which indicates that data at memory address 0x4444 should be read. If there are multiple processor nodes, then the actual memory at 0x4444 may be stored in a remote processor node. In some embodiments, the cache local to the processor node 102 (whether it is L1, L2, or a unified cache), may store the data and addresses of the most commonly used data for that processor node 102. If a cache miss occurs, meaning if the access to the cache yields a negative result, then the local memory 110 may be accessed next. The local arbiter 132 may be operable to facilitate this local memory access.

In some embodiments, the processor node 102 may include a local arbiter 132 and a switch 130 that may turn the local arbiter 132 on and off. The local arbiter 132 may be able to determine if it is the local arbiter 132 or a remote arbiter (i.e., coupled to one a remote processor node) that should perform a memory coherency check. The memory coherency check consists of resolving any conflicts to the same memory address by two or more processor nodes and/or cores, ordering multiple accesses to the same memory by the two or more processor nodes and/or cores, and sending confirmation to arbiter(s) in the other processor node(s) such that they may update any references and/or tables regarding the location and/or contents of a given memory space. Thus the local and the remote arbiters may be able to synchronize not only any multiple memory access conflicts, but also the information regarding the contents and/or the location of each memory address in the one or more of the arbiters.

Thus, the switch 130 may be operable to turn the local arbiter 132 on/off. The local arbiter 132 may have one or more queues that keep all of the memory accesses. In some embodiments, the local arbiter 132 may impose ordering on all of the memory accesses, e.g., if there are two accesses to the same memory then the local access would always get serviced first (i.e., fulfilled), or the access from a lower numbered processor node would be services first. In other words, any one or more of ordering/conflict resolution rules may be imposed by the arbiter handling the memory access.

Once a local arbiter 132 performs a memory access, then the data may be read and then either used by the local processor node, e.g., such as in an ADD operation, or it may be forwarded to a remote arbiter in a remote processor node that has initiated the memory access.

When the local arbiter 132 is turned on, e.g., by having the switch 130 in the ON position, the local arbiter 132 may perform the memory coherency check regarding the memory access requests. The local arbiter 132 may also facilitate memory access, i.e., access the local memory at an address specified in the memory access request.

When the local arbiter 132 is turned off, e.g., by having the switch 130 in the OFF position, the local arbiter 132 may be disabled and only perform memory accesses. In this scenario, in some embodiments, the processor node 102 may couple to a central arbiter 300, such as described below with reference to FIG. 3. Thus, when the switches of two processor nodes are both in OFF positions, then the processor nodes may be coupled to the central arbiter. The processor nodes are configured to communicate with each other using a coherency protocol. A change in the distributed shared memory topology may not alter the coherence protocol, meaning that the communication between the processor nodes, and specifically between their respective local arbiters remains the same. Thus this allows for a flexible and scalable solution across various distributed shared memory topologies.

The switch 130 may be turned ON to disable the local arbiter 132, and turned OFF to enable the local arbiter 132. In some embodiments the switch 130 may have multiple positions, each corresponding to one or more configurations of the local arbiter 132. In other words, various functions of the local arbiter 132 may be turned on or off depending on the position of the switch 130.

In some embodiments, the switch 130 may be implemented by a register, meaning that one or more bits in an internal register of the processor node may be set to '0' or '1' in order to place the switch in the desired position. For example, a register level command from software may direct the switch 130 to be placed in a desired position. In some embodiments, a BIOS or an analogous structure may write to the register may direct the switch 130 to be placed in a desired position. In some embodiments, other ways to write to the register of the processor node 102 may be used.

In some embodiments, the switch 130 may be implemented as one or more separate lines to the processor node 102. In other words, the actual chip assembly of the processor node 102 may have one or more leads that directly set the status of the switch 130. Thus there line may be tied to the ground or to a power in order to permanently place the switch 130 in a desired position, i.e., thus eliminating the need to use register-level and/or BIOS-level programming.

In some embodiments, the arbiter 132 may be a logical unit within the processor node 102. In other words, the arbiter 132 may be contained within the actual chip assembly of the processor node 102. Thus the switch 130, which may be internal to the processor node 102, may enable one or more functions of the local arbiter 132, which also may be contained within the actual chip assembly of the processor node 102.

In some embodiments, the local memory 110 may be coupled to the processor node 102. Thus when there are two or more processor nodes, the total memory may be divided between the two or more processor nodes. The total memory may be divided substantially equally between the nodes, or using some other schema, such as the processor node one having ¾ of the total memory, and the other processor node(s) dividing the remaining amount of the total memory. In some embodiments, the memory used may include DRAM, SDRAM, SRAM, EPROM, EEPROM, flash, or any other type and/or a combination of types of memory, such as non-volatile RAM (NVRAM), TTRAM, SONOS, NRAM, MRAM, FRAM, and/or Z-RAM. The local memory 110 may consist of one or more banks of memory. A memory node decode may operate to determine which processor node has the memory portion that the memory access is trying to access, such as by examining the m-th bit of the address, meaning that in a system with two processor nodes, all the memory where the m-bit is '0' would be local to the first processor node, and all the memory where the m-bit is '1' would be local to the second processor node. Other division of the total memory may be used, such as where there are three or more processor nodes (i.e., more than 1 bit may be used).

The local memory may be coupled to the processor node using one or more of a data bus and an address bus. The local memory may be coupled to the processor node using a memory input/output bus (I/O bus). Other connections between the processor node 102 and the local memory 110 are also possible.

It is noted that the block diagrams of FIGS. 1A and 1B are exemplary only. Further, various blocks of FIGS. 1A and 1B may be present in different order than that shown, or may not be present, as desired. Also, various additional blocks may be included as desired.

Figure 2:
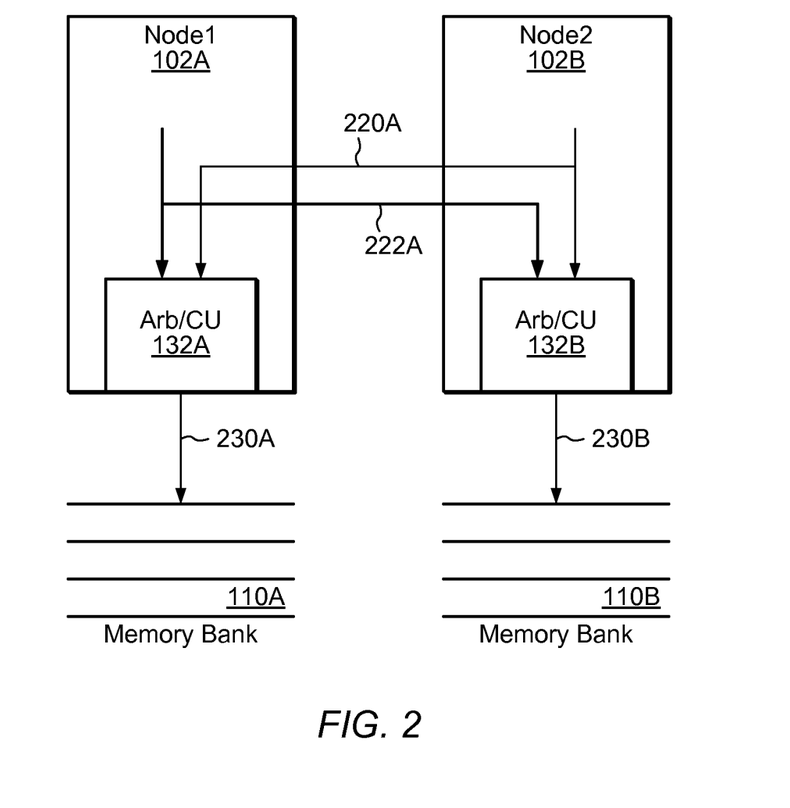
FIG. 2 is a block diagram of an exemplary multi-processor node system using distributed local arbiters, according to some embodiments.

FIG. 2—Exemplary Multi-processor Node System Using Distributed Local Arbiters

FIG. 2 is directed to an exemplary model diagram of a multi-processor node system that used two processor nodes with distributed arbiters (i.e., a glueless topology). In some embodiments, three or more processor nodes may be coupled together using this topology.

In some embodiments, all of the switches the coupled processor nodes 102A-B may be set to the same position, e.g., all ON or all OFF. In some embodiments, only one of the processor nodes 102A-B, e.g., a master processor node, may be set to a position that may dictate the distributed memory configuration. In some embodiments, there may be more than two positions of the switch, e.g., the processor nodes 102A-B may be configurable to operate in a point-to-point, fully connected, bus, star, ring, mesh, or a hybrid network topology.

In some embodiments, for a first topology, such as the glueless or distributed topology shown in FIG. 2, two processor nodes 102A-B may be coupled together (without a central arbiter). In some embodiments (not shown), three or more processor nodes may be coupled together. The general operation of the distributed shared memory operates similarly and is scalable between various number of processor nodes. Each processor node may couple to any other processor node using one or more of a control bus, a data bus, and an address bus, shown here as elements 220A and 222A.

In some embodiments, the first arbiter 132A may couple to the second arbiter 132B of the second processor node 102B using one bus that combines control, data, and address information. These one or more buses may carry the information necessary to implement the distributed shared memory techniques described herein. In some embodiments, each processor node may be individually connected to all of the two or more other processor nodes. In some embodiments, each processor node may connect only to its immediate neighbor and forward any messages from a first processor node to a second processor as needed.

Thus, each of the processor nodes 102A-102B may include a respective local arbiter 132A-B. In some embodiments, when operating in the first distributed shared memory topology, all of the functionality of the respective local arbiters 102A-B may be enabled i.e., the respective local arbiters 102A-B may only be able to perform address agent decode operations, memory coherency checks, as well as coordinate synchronization messages, such as described with reference to FIG. 4.

In some embodiments, each local arbiter 132A-B may be configured to coordinate memory access to its own local memory only (110A-B respectively). Each processor node 102A-B may couple to a respective local memory 110A-B using one or more of an address bus 112 and a data bus 114, shown collectively as one memory bus 230A-B respectively.

By using a memory coherency check, two or more processor nodes may resolve any memory access conflicts, ensuring that the two or more processor nodes will not process the same value at the same time. Specifically, as long as none of the processor nodes 102A-B updates a value at a memory location, then this value may be shared. However, as soon as one of the processor nodes updates the value at a memory location, the other processor nodes may be using an out-of-date copy. Memory coherency may operate to notify all processor nodes of changes to shared values. Thus memory coherency may include ordering all memory access requests and informing all processor nodes of changes to a value at a given memory location. Memory coherency also may include a cache scheme that will operate to update the cache of each processor node if it holds a value of a specific memory access (which may become an out-of-date copy).

It is noted that the block diagram of FIG. 2 is exemplary only. Further, various blocks of FIG. 2 may be present in different order than that shown, or may not be present, as desired. Also, various additional blocks may be included as desired.

Figure 3:
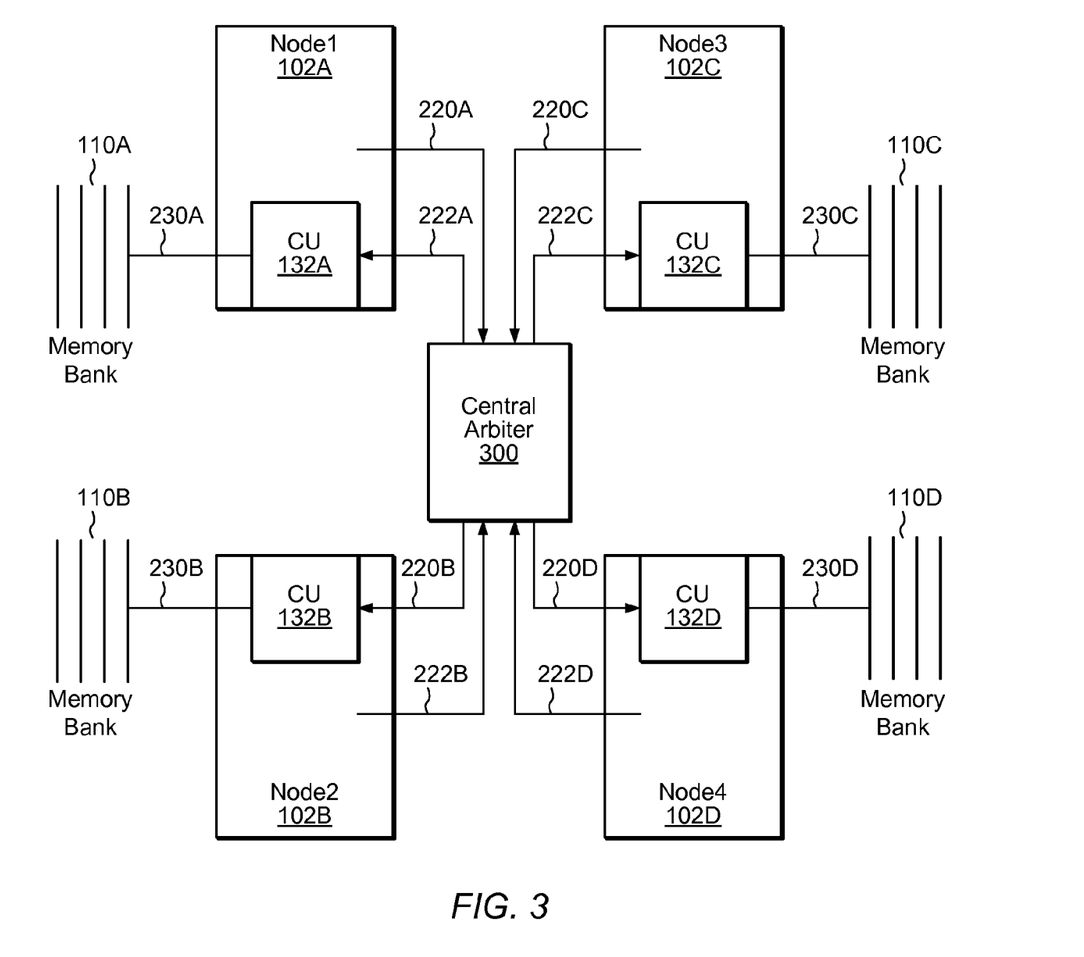
FIG. 3 illustrates is a block diagram of an exemplary multi-processor node system using a centralized arbiter, according to some embodiments.

FIG. 3—Exemplary Multi-processor Node System Using a Centralized Arbiter

This figure is directed to an exemplary model diagram of a multi-processor node system that used four processor nodes and a centralized arbiter. In some embodiments, only two processor nodes may be coupled together and use a centralized arbiter.

In some embodiments, all of the switches in all of the coupled processor nodes may be set to the same position, e.g., all ON or all OFF. In some embodiments, only one of the processor nodes, e.g., a master node, may be set to a position that may dictate the distributed memory configuration. In some embodiments, there may be more than two positions of the switch, e.g., the processor nodes may be configurable to operate in a point-to-point, fully connected, bus, star, ring, mesh, or a hybrid network topology.

In some embodiments, for a second topology, such as the start topology shown in FIG. 3B, four processor nodes 102A-D may be coupled together to a central arbiter 300. In some embodiments (not shown), only two processor nodes 102A-B may be coupled together to the central arbiter 300. The general operation of the distributed shared memory operates similarly and is scalable between various number of processor nodes 102. In some embodiments, the central arbiter 300 may couple to each of the processor nodes 102A-D using one or more of a control bus, a data bus, and an address bus, shown here as elements 220A-D and 222A-D. The central arbiter 300 may couple to each of the processor nodes 102A-D using one bus that combines control, data, and address information. These one or more buses may carry the information necessary to implement the distributed shared memory techniques described herein. Furthermore, each of the processor nodes 102A-102D may include a respective local arbiter 132A-D.

When operating in the second distributed shared memory topology, some of the functionality of the respective local arbiters 102A-D may be disabled; i.e., the respective local arbiters 102A-D may only be able to perform address agent decode operations, and allow the central arbiter 300 to perform memory coherency checks as well as coordinating synchronization messages, such as described with reference to FIG. 5. In some embodiments, other functionality of the local arbiters 102A-D may be disabled.

In some embodiments, the central arbiter 300 is configured to coordinate memory access to distributed shared memory for total memory in the computer system. The central arbiter 300 may be configured to coordinate memory access to distributed shared memory for only a portion of the total memory in the computer system. Each processor node 102A-D may couple to a respective local memory using one or more of an address bus 112 and a data bus 114, shown collectively as one memory bus 230A-D respectively.

In some embodiments, memory coherency is a scheme that allows two or more processor nodes to resolve access conflicts, such that the two or more processor nodes will not process the same value at the same time. Specifically, as long as none of the processor nodes 102A-D updates a value at a memory location, then this value can be shared. However, as soon as one of the processor nodes updates the value at a memory location, the other processor nodes may be using an out-of-date copy. Memory coherency operates to notify all processor nodes of changes to shared values. As used herein, memory coherency includes ordering all memory access requests and informing all processor nodes of changes to a value at a given memory location. In some embodiments, memory coherency also may include a cache scheme that will operate to update the cache of each processor node if it holds a value of a specific memory access (which may become an out-of-date copy).

It is noted that the block diagram of FIG. 3 is exemplary only. Further, various blocks of FIG. 3 may be present in different order than that shown, or may not be present, as desired. Also, various additional blocks may be included as desired.

Figure 4:
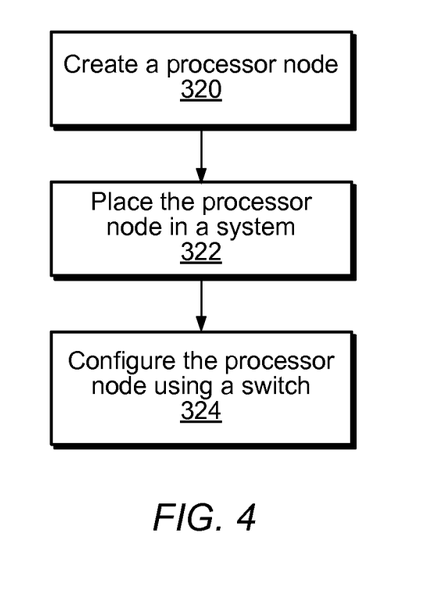
FIG. 4 is an exemplary flow chart of a method for using a processor node, according to some embodiments.

FIG. 4—Exemplary Flow Chart of a Method for Using a Processor Node

FIG. 4 is an exemplary flow chart of a method for using a processor node, according to some embodiments.

In 320, a processor node may be created, such as by manufacturing a chip that contains one or more elements of the processor node. Thus a processor node that contains a processing core, one or more caches, an arbiter, and a switch may be created.

In 322, the processor node may be placed in a system, such as a multi-processor system.

In 324, the processor node may be configured (e.g., using a switch on one or more of the two or more processor nodes) to operate using a selected distributed shared memory topology.

Thus each of the two or more processor nodes can be configured to operate in one of a plurality of different distributed shared memory topologies without having to use a different version of that processor node. This may have the benefit of lower manufacturing costs for the maker of the processor node. This is because only one version of the processor node is needed, instead of multiple versions where each is adapted for a different distributed memory model. In addition, this may have the benefit of lower manufacturing costs for the creator of the multi-processor system that uses the processor nodes, because regardless of the distributed shared memory topology, the same processor node may be used. Thus processor nodes may be configured to be in a selected shared memory topology after they have been included in the multi-processor system, or alternatively after fabrication and prior to being included in the multiprocessor system. Thus in some embodiments the processor node may be configured prior to being placed in the multi-processor system.

It is noted that the flow chart of FIG. 4 is exemplary only. Further, various elements of FIG. 4 may be present in different order than that shown, or may not be present, as desired. Also, various additional elements may be included as desired.

Figure 5:
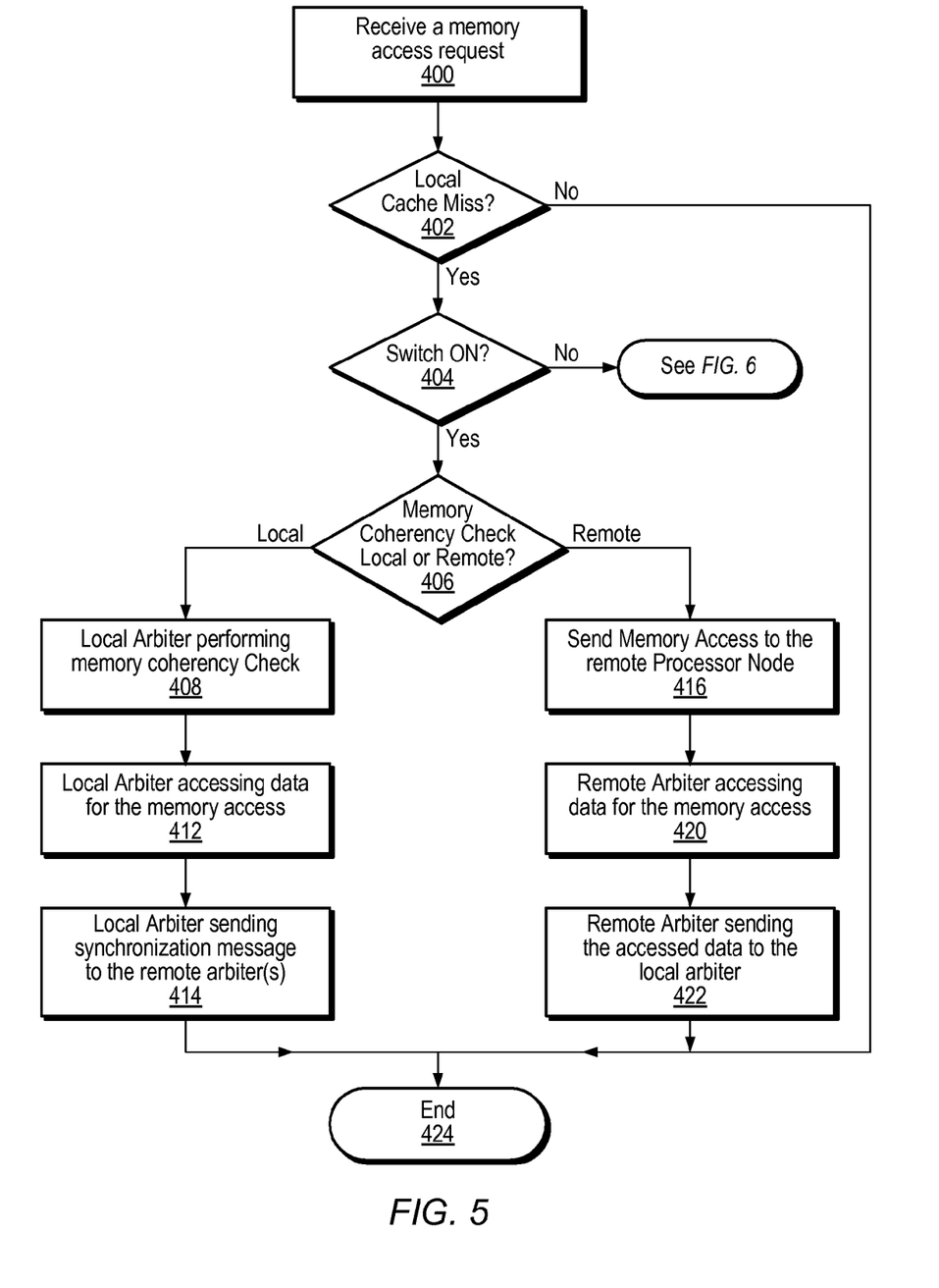
FIG. 5 is an exemplary flow chart of a method for processing memory requests in a first topology, according to some embodiments.

FIG. 5—Exemplary Flowchart of a Method for Processing Memory Requests in a First Topology FIG. 5 shows an exemplary flowchart of a method for processing memory requests in a first topology, according to some embodiments. The first distributed memory topology may be a glueless topology. In some embodiments, the first distributed memory topology may be some other type or a combination of distributed memory topologies, including point-to-point, fully connected, bus, star, ring, mesh, or a hybrid network topology.

In 400, a memory access request may be received. For example, a processor node, e.g., the first processor node, may receive a request from instructions corresponding to some software executing on the system to read (or write) memory at a first address.

In 402, the first processor node may attempt to read (or write) the data into a memory address at the first address using its local cache. As described above, the cache may be any cache level applicable to the system, or some combination of, such as L1, L2, and L3 cache.

If the data was available in the local cache, then the first processor node simply may read the data from the cache (or write the data to the cache). However, if there is a cache miss, then the memory request will proceed to using the arbiter as explained below.

In 404, the processor node may determine if the switch is ON or OFF. If the switch is ON, then the first distributed memory topology may be used, as described here. If the switch is OFF, then the second distributed memory topology may be used, as described with reference to FIG. 6.

In some embodiments, the result of having the switch ON and OFF is reversed, meaning that the processor node, and thus the arbiter, may be placed in the first topology when the switch is OFF, and may be placed in the second topology when the switch is ON. In some embodiments, as mentioned above, the switch may have multiple other positions that would place the processor node, and thus the arbiter, in a variety of different distributed memory topologies/configurations.

In 406, in some embodiments, the first local arbiter may perform a memory node decode, meaning it may determine which processor node is responsible for performing a memory coherency check.

If the local arbiter is determined to be responsible for the memory coherency check, then the first arbiter will continue processing the memory access request. This is described with reference to 408-414 below.

If a remote arbiter is determined to be responsible for the memory coherency check, them the second arbiter will continue processing of the memory access request. This is described with reference to 416-422 below.

In 408, in some embodiments, the local arbiter may perform the memory coherency check. The memory coherency check may operate to resolve any conflicts, and queue memory access requests from multiple processor nodes.

In 412, the local arbiter may access data in the first local memory (i.e., memory local to the processor node containing the local arbiter) at the address specified by the memory request. Alternatively, for a write operation (instead of the read operation described above), the local arbiter may operate to write data/value in the remote memory at the address specified by the memory request.

In 414, the local arbiter may send one or more synchronization messages to one or more remote arbiters. For a read memory access, the local arbiter may send a snoop message to the remote (e.g., the second) arbiter. If the snoop message returns valid data from cache from the remote arbiter, then the local arbiter may use the data returned from the remote arbiter instead of the data read from the local (e.g., first) memory. Alternatively, for a write memory access, the local arbiter may not send any synchronization messages such as snoop messages, to the one or more remote arbiters.

Alternatively, in some embodiments, if the memory coherency check indicates a remote arbiter (see 406 above), then the following may occur.

In 416, the local arbiter may send the memory request to the remote (e.g., second) processor node. In other words, the local arbiter may send the memory request to the remote (e.g., second) arbiter for processing.

In 420, the remote arbiter may access data in the first remote memory (i.e., which here is second memory that is local to the remote, or second, processor node containing the remote, or second, arbiter) at the address specified by the memory request. Alternatively, for a write operation (instead of the read operation described above), the remote arbiter may operate to write data/value in the remote memory at the address specified by the memory request.

In 422, the remote arbiter may send the read data back to the local (i.e., first) arbiter that initially send the memory access request in 416. In some embodiments, the remote arbiter may not send any synchronization messages to the other arbiters. In some embodiments, the remote arbiter may send some synchronization messages to the other arbiters (such as to the local, or first, arbiter). Also, for a write memory access, the remote arbiter may not send any synchronization messages such as snoop messages, to the other arbiters.

In some embodiments, after either the local arbiter sends one or more synchronization messages to the remote arbiter, or if the remote arbiter sends the accessed data to the local arbiter, the memory access may be complete. In case of a write request (as opposed to a read request), elements 414 and/or 422 may not be applicable. Furthermore, if one of the synchronization messages send to the remote arbiter 414 (e.g., a snoop) returns with valid data, then the local arbiter may use the data returned from the remote cache instead of the data read from the local (e.g., first) memory 412.

For example, in a two processor node system in the first topology, on a read memory access in the first processor node that results in a cache miss, where the first processor node has first local memory, and local arbiters enabled, the following may occur:

1) In the local arbiter of the first processor node (i.e., the first arbiter), decode (via the memory node decode) the memory access to determine which processor node is configured to perform the memory coherency check;
2) If the decode determines that the first processor node should handle the memory coherency check (i.e., the local arbiter), then the memory access will be processed in the first processor node;
3) Perform the memory coherence check in the first arbiter in the first processor node. Order all memory accesses to the same memory address; and
4) Access the first local memory and caches of the first processor node. Read the data at the address indicated by the memory access;
5) Send a synchronization message (e.g., a snoop) to the second cache in the second processor node;
6) If there is a cache hit in the cache of the second processor node, use that cache data. Otherwise, use the memory data read from the first processor node.

In a related example, the following may take place in some embodiments on a memory read request:

1) In the local arbiter of the processor node 1 (i.e., the first arbiter), decode (via the memory node decode) the memory access to determine which processor node is configured to perform the memory coherency check;
2) If the decode determines that the second processor node should handle the memory coherency check (i.e., the remote arbiter), send the memory access to the second processor node;
3) Perform the memory coherence check in the second arbiter in the second processor node. Order all memory accesses to the same memory address; and
4) Access the second local memory and caches of the second processor node. Read the data at the address indicated by the memory access.
5) Return data to the first processor node.

In some embodiments, a write memory access will be processed in a similar fashion to the read memory access described above. For example, a write request goes to the arbiter which does a memory node decode and a conditional coherence check (based on the results of the memory node decode). After the coherence check is completed, a write request is placed to memory and the request is completed. For example, on a write from the first processor node to the local memory attached to the second processor node and local arbiters enabled:

1) In the local arbiter of the first processor node (i.e., the first arbiter), decode (via the memory node decode) the memory access to determine which processor node is configured to perform the memory coherency check;
2) If the decode determines that the second processor node should handle the memory coherency check (i.e., the remote arbiter), send the memory access to the second processor node, otherwise perform the memory coherency check in the first processor node;
3) If a remote arbiter is determined above, perform the memory coherence check in the second arbiter in the second processor node. Order all memory accesses to the same memory address; and
4) Write the data into the second local memory and caches of the second processor node at the address indicated by the memory access.

It is noted that the flowchart of FIG. 4 is exemplary only. Further, various elements of FIG. 4 may be present in different order than that shown, or may not be present, as desired. Also, various additional elements may be included as desired.

Figure 6:
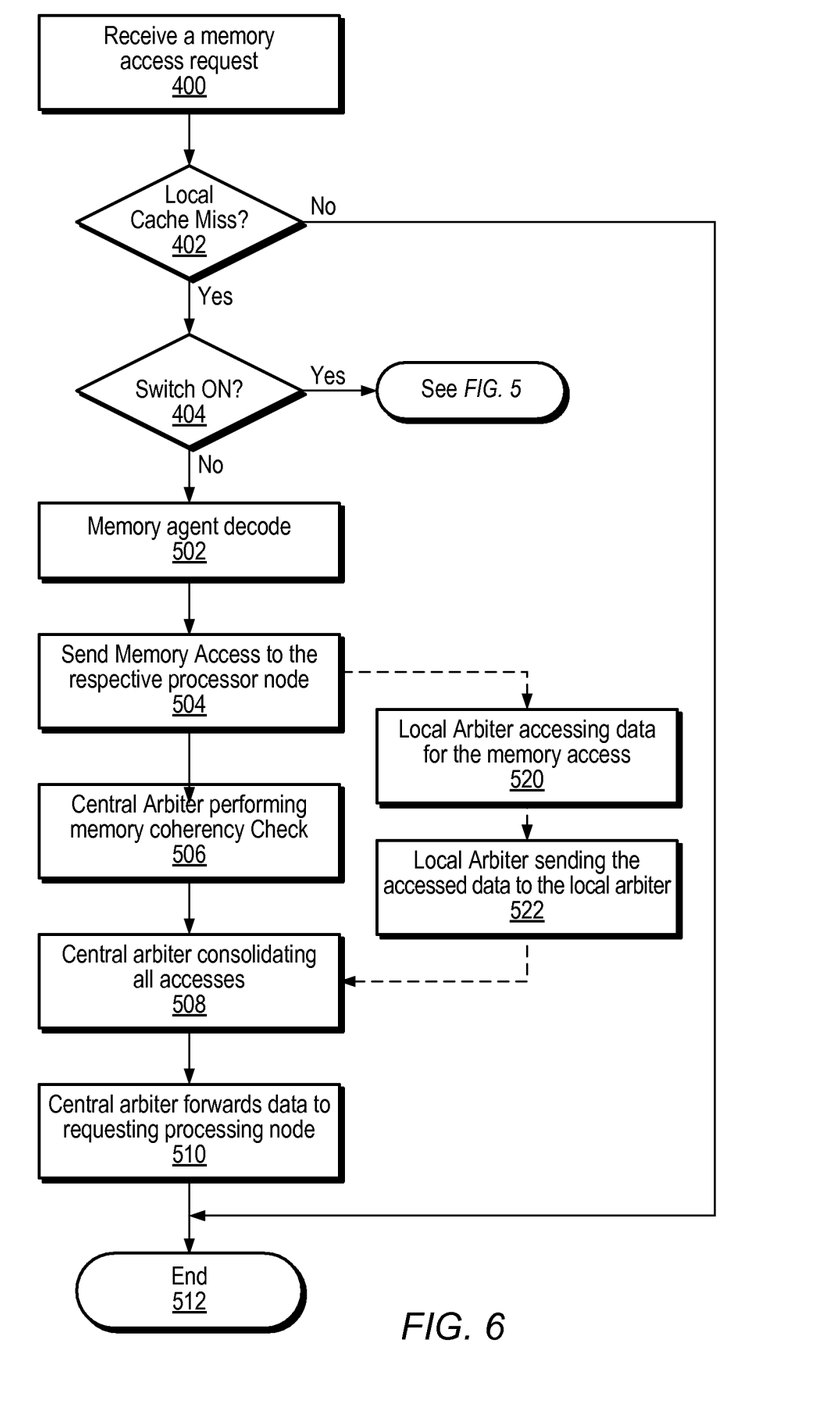
FIG. 6 is an exemplary flow chart of a method for processing memory requests in a second topology, according to some embodiments.

FIG. 6—Exemplary Flowchart of a Method for Processing Memory Requests in a Second Topology FIG. 6 shows an exemplary flowchart of a method for processing memory requests in a second topology, according to some embodiments. The second distributed memory topology may be a star topology. In some embodiments, the second distributed memory topology may be some other type or a combination of distributed memory topologies, including point-to-point, fully connected, bus, ring, mesh, or a hybrid network topology.

In 400, a memory access request may be received. For example, a processor node, e.g., the first processor node, may receive a request from instructions corresponding to some software executing on the system to read (or write) memory at a first address.

In 402, the first processor node may attempt to read (or write) the data into a memory address at the first address using its local cache. As described above, the cache may be any cache level applicable to the system, or some combination thereof, e.g., L1, L2, and L3 cache.

If the data was available in the local cache, then the first processor node simply may read the data from the cache (or write the data to the cache). However, if there is a cache miss, then the memory request will proceed to using the central arbiter as explained below.

In 404, the processor node may determine if the switch is ON or OFF. If the switch is OFF, then the second distributed memory topology may be used, as described here. If the switch is ON, then the first distributed memory topology may be used, as described with reference to FIG. 5.

In some embodiments, the result of having the switch ON and OFF is reversed, meaning that the processor node, and thus the arbiter, may be placed in the first topology when the switch is OFF, and may be placed in the second topology when the switch is ON. In some embodiments, as mentioned above, the switch may have multiple other positions that would place the processor node, and thus the arbiter, in a variety of different distributed memory topologies/configurations.

In 502, the central arbiter may perform a memory node decode in order to determine the proper processor node that is responsible for the memory indicated in the memory access.

Alternatively, in some embodiments, the arbiter of the requesting processor node may perform the memory node decode in order to determine the proper processor node that is responsible for the memory indicated in the memory access. In this case, the arbiter of the requesting processor node may send an indication which processor node to use to the central arbiter.

In 504, the central arbiter may send the memory request to the arbiter of the processor node that contains the memory location indicated by the memory request. In some embodiments, the local arbiter may send the memory request to the remote (e.g., second) arbiter in order to access the memory indicated in the memory access.

In 506, the central arbiter may perform the memory coherency check. The memory coherency check may operate to resolve any conflicts, and queue memory access requests from the multiple processor nodes. In some embodiments, the central arbiter may send synchronization messages to the other arbiters, such as snoops to the caches of the processor nodes. Also, for a write memory access, the central arbiter may not send any synchronization messages to the other arbiters.

In 520, the proper processor node that received the memory access request 504 may access the memory indicated in the memory access. In some embodiments, a respective arbiter for the proper processor node may access data in its respective local memory at the address specified by the memory request. Alternatively, for a write operation (instead of the read operation described above), the respective arbiter may operate to write data/value in the respective local memory at the address specified by the memory request.

In 522, the proper processor node may then send the read data/value read from its respective local memory at the address specified by the memory request back to the central arbiter.

In 508, the central arbiter may consolidate all of the responses and synchronization messages. In other words, if one of the synchronization messages send to the central arbiter returns with valid data, then the central arbiter may use the data returned from the that cache 506 instead of the data read from the respective local memory 520.

In 510, the central arbiter may forward the value chosen in 508 as the valid data (for a read memory access) to the requesting processor node from 400. In some embodiments, on a write memory access request, the central arbiter may not forward any values to the requesting processor node.

For example, in a two processor node system in the second topology, on a read memory access in the first processor node that results in a cache miss, where the first processor node has first local memory, and central arbiter is enabled, the following may occur in some embodiments:

1) In the central arbiter, decode (via the memory node decode) the memory access to determine which processor node is configured to perform the memory access. Alternatively, the requesting processor node may perform the memory node decode in order to determine the proper processor node that is responsible for the memory indicated in the memory access. In this case, the arbiter of the requesting first processor node may send an indication of the proper processor node to use to to the central arbiter.

2) If the decode determines that the first processor node should handle the memory coherency check, then the memory access will be processed in the first processor node;

3) Perform the memory coherence check in the central arbiter. Order/resolve conflict between all memory accesses to the same memory address;

4) Use the first arbiter to access the first local memory. Read the data at the address indicated by the memory access in the first local memory;

5) The central arbiter sends one or more synchronization messages (e.g., a snoop) to all of the caches/processor nodes coupled to the central arbiter;

6) If there is a cache hit in the cache of the second processor node, the second processor node responds back to the central arbiter with indication/value of that snoop.

7) The central arbiter consolidates all the responses in the central arbiter. In some embodiments, the central arbiter may choose the data read from the cache of the second processor node instead of the data read from the local memory of the first processor node.

8) The central arbiter may forward the chosen data to the requesting processor node to complete the read request.

In some embodiments, a write memory access will be processed in a similar fashion to the read memory access described above. For example, a write request goes to the central arbiter which does a memory node decode and a conditional coherence check (based on the results of the memory node decode). After the coherence check is completed, a write request may be placed to memory of the selected processor node and the request is completed. For example, on a write from the first processor node to the memory attached to the second processor node and central arbiter enabled:

1) In the local arbiter of the first processor node (i.e., the first arbiter), decode (via the memory node decode) the memory access to determine which processor node is configured to perform the memory coherency check, and forward that information to the central arbiter. Alternatively the central arbiter may perform the memory node decode in order to determine the proper processor node that is responsible for the memory indicated in the memory access.

2) Perform the memory coherence check in the central arbiter. Order all memory accesses to the same memory address;

3) send a write request to the second processor node;

4) Write the data into the second local memory and caches of the second processor node at the address indicated by the memory access received from the central arbiter.

It is noted that the flowchart of FIG. 5 is exemplary only. Further, various elements of FIG. 5 may be present in different order than that shown, or may not be present, as desired. Also, various additional elements may be included as desired.

Although the embodiments above have been described in considerable detail, numerous variations and modifications will become apparent to those skilled in the art once the above disclosure is fully appreciated. It is intended that the following claims be interpreted to embrace all such variations and modifications.

The invention claimed is:

1. A processor system, comprising:
a first local memory;
a first processor node, wherein the first processor node is coupled to the first local memory, and wherein the first local memory is local to the first processor node, wherein the first processor node comprises:

a first processor; and a first local arbiter, wherein the first local arbiter is configured to:

in response to a memory conflict between a request for access to the first local memory and a request for access to the first local memory by one of other processor nodes, perform a coherency check on the first local memory, wherein the coherency check on the first local memory resolves the memory conflict for the first local memory in accordance with a coherency protocol; and a switch coupled to the first local arbiter for enabling or disabling the first local arbiter, wherein the switch is configured to turn the first local arbiter off for a central arbiter configuration in which a central arbiter maintains memory coherence of the first local memory and local memory of the other processor nodes, or on for a local arbiter configuration in which the first local arbiter maintains memory coherence of the first local memory and other local arbiters maintain memory coherence of the other processor nodes respectively.

2. The processor system of claim 1, wherein the first local arbiter is further configured to perform a memory node decode on the first local memory;

wherein when the first local arbiter is enabled, the first local arbiter is configured to perform both the coherency check and the memory node decode on the first local memory; and wherein when the first local arbiter is disabled, the central arbiter is configured to perform the coherency check on the first local memory and the first local arbiter is configured to perform the memory node decode on the first local memory.

3. The processor system of claim 1, wherein the first processor node is configured to couple to a second processor node having a second processor, a second local memory, and a second local arbiter configured to perform one or more of a memory node decode or the coherency check on the second local memory, wherein the second processor node comprises a second switch for enabling or disabling the second local arbiter; and wherein performing the coherency check comprises the first local arbiter or the second local arbiter resolving memory conflicts between one or more memory access requests from the first processor node and the second processor node.

4. The processor system of claim 3, wherein on a cache miss on a memory access in the first processor node, the first local arbiter is configured to perform a memory node decode to find an appropriate processor node; and wherein if the appropriate processor node is the first processor node, the first local arbiter is configured to access the first local memory to read data corresponding to the memory access; and wherein if the appropriate processor node is the second processor node, the first local arbiter is configured to forward the memory access to the second local arbiter.

5. The processor system of claim 4, wherein the first local arbiter is further configured to send a synchronizing message to the second local arbiter;

wherein if the second local arbiter returns valid data, the first local arbiter is configured to use the valid data from the second arbiter instead of data read from the first local memory.

6. The processor system of claim 4, wherein the second local arbiter, upon receiving the memory access from the first local arbiter, is configured to perform a memory coherency check on the second local memory prior to accessing the second local memory;

wherein the second local arbiter, after accessing the second local memory to read the data corresponding to the memory access, is configured to return the read data to the first local arbiter.

7. The processor system of claim 3, wherein when the first local arbiter is enabled, the first local arbiter is configured to perform the coherency check on the first local memory; and wherein when the first local arbiter is disabled, the central arbiter is configured to perform the coherency check on the first local memory.

8. The processor system of claim 7, wherein when both the first local arbiter and the second local arbiter are disabled, the first processor node and the second processor node are configured to operate in a second topology;

wherein on a cache miss for a memory access at a third processor node, the central arbiter is further configured to perform the memory coherency check; and wherein the third processor node is configured to perform memory node decode, wherein depending on results of the memory node decode, the third processor node is further configured to forward the memory access to either the first local arbiter or the second local arbiter to access the first local memory or the second local memory of the first processor node or the second processor node respectively.

9. The processor system of claim 8, wherein the first local arbiter or the second local arbiter is further configured to access the first local memory or the second local memory of the first processor node or the second processor node respectively in response to receiving the forwarded memory access; and wherein the first local arbiter or the second local arbiter, after accessing the first local memory or the second local memory to read data corresponding to the memory access, is configured to forward the data to the central arbiter.

10. The processor system of claim 9, wherein the central arbiter is further configured to send one or more synchronization messages to an other processor node;

wherein if the other processor node returns valid data, the central arbiter uses the valid data instead of the data forwarded from the first processor node or the second processor node.

11. A multi-core processor system, comprising:

a plurality of local memories;

a plurality of processor nodes, wherein each processor node is coupled to a respective one of the local memories, wherein each processor node comprises:

a respective processor; and a respective local arbiter for controlling memory access;

wherein the plurality of processor nodes comprises a first processor node having a first processor and a first local arbiter, and wherein the first processor and the first local arbiter are coupled to a first local memory of the plurality of local memories; and a first switch for enabling or disabling the first local arbiter, wherein the first switch is configured to turn the first local arbiter off for a central arbiter configuration in which a central arbiter maintains memory coherence of the plurality of local memories, or on for a local arbiter configuration in which the first local arbiter maintains memory coherence of the first local memory and other local arbiters maintain memory coherence of others of the plurality of processor nodes respectively in accordance with a coherency protocol, and wherein maintaining the memory coherence of the first local memory comprises:
  in response to a memory conflict between a request for access to the first local memory and a request for access to the first local memory by an other of the processor nodes, perform a coherency check on the first local memory, wherein the coherency check on the first local memory resolves the memory conflict for the first local memory in accordance with the coherency protocol.

12. The multi-core processor system of claim 11,
wherein when the first switch is in a first position, the first local arbiter is enabled and configured to perform memory coherency checks for the first processor node in accordance with the coherency protocol; and
wherein when the first switch is in a second position, the first local arbiter is disabled and the first processor node is configured to operate with the central arbiter to perform said memory coherency checks in accordance with the coherency protocol.

13. The multi-core processor system of claim 12,
wherein the plurality of processor nodes comprises a second processor node having a second processor and a second local arbiter, the multi-core processor system further comprising:
  a second switch for enabling or disabling the second local arbiter;
wherein when both the first and the second local arbiters are enabled, the plurality of processor nodes are configured to operate in a first topology, and each of the first and second processor nodes is configured to use the first and second local arbiters, respectively, for memory node decode.

14. The multi-core processor system of claim 13,
wherein on a cache miss of a memory access in the first processor node, the first local arbiter is configured to perform said coherency check on the first local memory coupled to the first processor node and either access the first local memory or forward the memory access to the second local arbiter depending on results of a memory node decode.

15. The multi-core processor system of claim 13, further comprising:
  a central arbiter, wherein the central arbiter is coupled to both the first and the second processor nodes;
    wherein when both the first and the second local arbiters are disabled the plurality of processor nodes are configured to operate in a second topology, and each of the first and second processor nodes is configured to use the central arbiter to perform said memory coherency checks.

16. The multi-core processor system of claim 15,
wherein on a cache miss of a memory access in the first processor node, the first local arbiter is configured to perform memory node decode, wherein if the memory node decode indicates the second processor node, the first processor node is further configured to forward the memory access to the second local arbiter to access a local memory of the second processor node;
wherein the second local arbiter is further configured to access the local memory of the second processor node in response to receiving the forwarded memory access; and
wherein the second local arbiter, after accessing the second local memory to read data corresponding to the memory access, is configured to forward the data to the central arbiter.

17. The multi-core processor system of claim 11,
wherein the plurality of processor nodes are configured to communicate with each other using the coherency protocol, wherein the coherency protocol includes one or more of memory access requests or synchronization messages; and
wherein configuration of the first switch does not alter the coherency protocol.

18. A method for operating a multi-core processor system, the method comprising:
  assembling the multi-core processor system, wherein the multi-core processor system comprises:
    a plurality of local memories;
    a plurality of processor nodes, wherein each processor node is coupled to a respective one of the local memories, wherein each processor node comprises:
      a respective processor; and
      a respective local arbiter for controlling memory access;
    wherein the plurality of processor nodes comprises a first processor node having a first processor and a first local arbiter, and wherein the first processor and the first local arbiter are coupled to a first local memory of the plurality of local memories;
  configuring a first switch to either enable or disable the first local arbiter, wherein the first switch is configured to turn the first local arbiter off for a central arbiter configuration in which a central arbiter maintains memory coherence of the plurality of local memories, or on for a local arbiter configuration in which the first local arbiter maintains memory coherence of the first local memory and other local arbiters maintain memory coherence of others of the plurality of processor nodes respectively in accordance with a coherency protocol, and wherein maintaining the memory coherence of the first local memory comprises:
    in response to a memory conflict between a request for access to the first local memory and a request for access to the first local memory by an other of the processor nodes, perform a coherency check on the first local memory, wherein the coherency check on the first local memory resolves the memory conflict for the first local memory in accordance with the coherency protocol.

19. The method of claim 18,
wherein when the first switch is in a first position, the first local arbiter is enabled and configured to perform memory coherency checks for the first processor node in accordance with the coherency protocol; and
wherein when the first switch is in a second position, the first local arbiter is disabled and the first processor node is configured to operate with the central arbiter to perform said memory coherency checks in accordance with the coherency protocol.

20. The method of claim 18,
wherein the plurality of processor nodes comprises a second processor node having a second processor and a second local arbiter, the method further comprising:
configuring a second switch for enabling or disabling the second local arbiter, wherein the second switch is configured to turn the second local arbiter off for the central arbiter configuration, or on for the local arbiter configuration.

* * * * *